(12) United States Patent
Daum et al.

(10) Patent No.: US 7,680,750 B2
(45) Date of Patent: Mar. 16, 2010

(54) METHOD OF PLANNING TRAIN MOVEMENT USING A THREE STEP OPTIMIZATION ENGINE

(75) Inventors: Wolfgang Daum, Erie, PA (US); John Hershey, Ballston Lake, NY (US); Randall Markley, Melbourne, FL (US); Paul Julich, Indialantic, FL (US); Mitchell Scott Wills, Melbourne, FL (US); David Davenport, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 749 days.

(21) Appl. No.: 11/476,552

(22) Filed: Jun. 29, 2006

(65) Prior Publication Data

US 2008/0005050 A1 Jan. 3, 2008

(51) Int. Cl.
*G06N 5/00* (2006.01)
(52) U.S. Cl. .......................... 706/19; 706/45
(58) Field of Classification Search ................ 706/45, 706/46, 47, 19; 701/19
See application file for complete search history.

(56) References Cited

U.S. PATENT DOCUMENTS

| | | | |
|---|---|---|---|
| 3,575,594 A | 4/1971 | Elcan | |
| 3,734,433 A | 5/1973 | Metzner | |
| 3,794,834 A | 2/1974 | Auer, Jr. et al. | |
| 3,839,964 A | 10/1974 | Gayot | |
| 3,895,584 A | 7/1975 | Paddison | |
| 3,944,986 A | 3/1976 | Staples | |
| 4,099,707 A | 7/1978 | Anderson | |
| 4,122,523 A | 10/1978 | Morse et al. | |
| 4,361,300 A | 11/1982 | Rush | |
| 4,361,301 A | 11/1982 | Rush | |
| 4,610,206 A | 9/1986 | Kubala et al. | |
| 4,669,047 A | 5/1987 | Chucta | |
| 4,791,871 A | 12/1988 | Mowll | |
| 4,843,575 A | 6/1989 | Crane | |
| 4,883,245 A | 11/1989 | Erickson, Jr. | |
| 4,926,343 A | 5/1990 | Tsuruta et al. | |
| 4,937,743 A * | 6/1990 | Rassman et al. ............... 705/8 |
| 5,038,290 A | 8/1991 | Minami | |
| 5,063,506 A | 11/1991 | Brockwell et al. | |
| 5,177,684 A | 1/1993 | Harker et al. | |
| 5,222,192 A | 6/1993 | Shafer | |
| 5,229,948 A | 7/1993 | Wei et al. | |
| 5,237,497 A | 8/1993 | Sitarski | |

(Continued)

FOREIGN PATENT DOCUMENTS

CA 2057039 12/1990

(Continued)

OTHER PUBLICATIONS

James N. K. Liu et al., Fuzzy Neural Networks for Machine Maintenance in Mass Transit Railway System, 1997, IEEE, 932-941.*

(Continued)

*Primary Examiner*—Wilbert L Starks, Jr.
(74) *Attorney, Agent, or Firm*—Duane Morris LLP

(57) ABSTRACT

A method of scheduling network resources in a first domain by transforming the problem to a second domain, solving the problem and transforming back to the first domain.

7 Claims, 1 Drawing Sheet

U.S. PATENT DOCUMENTS

| | | | |
|---|---|---|---|
| 5,265,006 A | 11/1993 | Asthana et al. | |
| 5,289,563 A | 2/1994 | Nomoto et al. | |
| 5,311,438 A | 5/1994 | Sellers et al. | |
| 5,331,545 A | 7/1994 | Yajima et al. | |
| 5,332,180 A | 7/1994 | Peterson et al. | |
| 5,335,180 A | 8/1994 | Takahashi et al. | |
| 5,365,516 A | 11/1994 | Jandrell | |
| 5,390,880 A | 2/1995 | Fukawa et al. | |
| 5,420,883 A | 5/1995 | Swensen et al. | |
| 5,437,422 A | 8/1995 | Newman | |
| 5,463,552 A | 10/1995 | Wilson et al. | |
| 5,467,268 A | 11/1995 | Sisley et al. | |
| 5,487,516 A | 1/1996 | Murata et al. | |
| 5,541,848 A | 7/1996 | McCormack et al. | |
| 5,623,413 A * | 4/1997 | Matheson et al. | 701/117 |
| 5,745,735 A | 4/1998 | Cohn et al. | |
| 5,794,172 A * | 8/1998 | Matheson et al. | 701/117 |
| 5,823,481 A | 10/1998 | Gottschlich | |
| 5,825,660 A | 10/1998 | Cagan et al. | |
| 5,828,979 A | 10/1998 | Polivka et al. | |
| 5,850,617 A | 12/1998 | Libby | |
| 6,032,905 A | 3/2000 | Haynie | |
| 6,115,700 A | 9/2000 | Ferkinhoff et al. | |
| 6,125,311 A | 9/2000 | Lo | |
| 6,144,901 A | 11/2000 | Nickles et al. | |
| 6,154,735 A * | 11/2000 | Crone | 706/45 |
| 6,250,590 B1 | 6/2001 | Hofestadt et al. | |
| 6,351,697 B1 | 2/2002 | Baker | |
| 6,377,877 B1 | 4/2002 | Doner | |
| 6,393,362 B1 | 5/2002 | Burns | |
| 6,405,186 B1 | 6/2002 | Fabre et al. | |
| 6,459,965 B1 | 10/2002 | Polivka et al. | |
| 6,587,764 B2 * | 7/2003 | Nickles et al. | 701/19 |
| 6,637,703 B2 | 10/2003 | Matheson et al. | |
| 6,654,682 B2 * | 11/2003 | Kane et al. | 701/202 |
| 6,766,228 B2 | 7/2004 | Chirescu | |
| 6,789,005 B2 | 9/2004 | Hawthorne | |
| 6,799,097 B2 | 9/2004 | Villarreal Antelo | |
| 6,799,100 B2 | 9/2004 | Burns | |
| 6,853,889 B2 | 2/2005 | Cole | |
| 6,856,865 B2 | 2/2005 | Hawthorne | |
| 7,006,796 B1 | 2/2006 | Hofmann et al. | |
| 7,159,219 B2 * | 1/2007 | Chen et al. | 718/103 |
| 2003/0105561 A1 * | 6/2003 | Nickles et al. | 701/19 |
| 2003/0183729 A1 | 10/2003 | Root et al. | |
| 2004/0010432 A1 | 1/2004 | Matheson et al. | |
| 2004/0034556 A1 | 2/2004 | Matheson et al. | |
| 2004/0093196 A1 | 5/2004 | Hawthorne et al. | |
| 2004/0093245 A1 | 5/2004 | Matheson et al. | |
| 2004/0267415 A1 | 12/2004 | Lacote et al. | |
| 2005/0107890 A1 | 5/2005 | Minkowitz et al. | |
| 2005/0192720 A1 | 9/2005 | Christie et al. | |
| 2006/0074544 A1 | 4/2006 | Morariu et al. | |

FOREIGN PATENT DOCUMENTS

| | | |
|---|---|---|
| CA | 2066739 | 2/1992 |
| CA | 2046984 | 6/1992 |
| CA | 2112302 | 6/1994 |
| CA | 2158355 | 10/1994 |
| EP | 0108363 | 5/1984 |
| EP | 0193207 | 9/1986 |
| EP | 0341826 | 11/1989 |
| EP | 0554983 | 8/1993 |
| FR | 2692542 | 12/1993 |
| GB | 1321053 | 6/1973 |
| GB | 1321054 | 6/1973 |
| JP | 3213459 | 9/1991 |
| WO | WO 90/03622 | 4/1990 |
| WO | WO 93/15946 | 8/1991 |

OTHER PUBLICATIONS

Tadahiko Murata et al., Rule Conversion in Knowledge Acquisition for Flowshop Scheduling Problems, 2001, IEEE, 2417-2421.*

Crone, et al., "Distributed Intelligent Network Management for the SDI Ground Network," IEEE, 1991, pp. 722-726, Milcom'91.

Ghedira, "Distributed Simulated Re-Annealing for Dynamic Constraint Satisfaction Problems," IEEE 1994, pp. 601-607.

Hasselfield, et al., "An Automated Method for Least Cost Distribution Planning," IEEE Transactions on Power Delivery, vol. 5, No. 2, Apr. 1990, 1188-1194.

Herault, et al., "Figure-Ground Discrimination: A Combinatorial Optimization Approach," IEEE Transactions on Pattern Analysis & Machine Intelligence, vol. 15, No. 9, Sep. 1993, 899-914.

Igarashi, "An Estimation of Parameters in an Energy Fen Used in a Simulated Annealing Method," IEEE, 1992, pp. IV-180-IV-485.

Komaya, "A New Simulation Method and its Application to Knowledge-based Systems for Railway Scheduling," May 1991, pp. 59-66.

Puget, "Object Oriented Constraint Programming for Transportation Problems," IEEE 1993, pp. 1-13.

Sasaki, et al., "Development for a New Electronic Blocking System," QR of RTRI, vol. 30, No. 4, Nov. 1989, pp. 198-201.

Scherer, et al., "Combinatorial Optimization for Spacecraft Scheduling," 1992 IEEE International Conference on Tolls with AI, Nov. 1992, pp. 120-126.

Watanabe, et al., "Moving Block System with Continuous Train Detection Utilizing Train Shunting Impedance of Track Circuit," QR of RTRI, vol. 30, No. 4, Nov. 1989, pp. 190-197.

* cited by examiner

METHOD OF PLANNING TRAIN MOVEMENT USING A THREE STEP OPTIMIZATION ENGINE

RELATED APPLICATIONS

The present application is related to the commonly owned U.S. patent application Ser. No. 11/415,273 entitled "Method of Planning Train Movement Using A Front End Cost Function", Filed May 2, 2006, which is hereby incorporated herein by reference.

BACKGROUND OF THE INVENTION

The present invention relates to the scheduling of movement of plural units through a complex movement defining system, and in the embodiment disclosed, to the scheduling of the movement of freight trains over a railroad system using a three step optimization engine.

Systems and methods for scheduling the movement of trains over a rail network have been described in U.S. Pat. Nos. 6,154,735, 5,794,172, and 5,623,413, the disclosure of which is hereby incorporated by reference.

As disclosed in the referenced patents and applications, the complete disclosure of which is hereby incorporated herein by reference, railroads consist of three primary components (1) a rail infrastructure, including track, switches, a communications system and a control system; (2) rolling stock, including locomotives and cars; and, (3) personnel (or crew) that operate and maintain the railway. Generally, each of these components are employed by the use of a high level schedule which assigns people, locomotives, and cars to the various sections of track and allows them to move over that track in a manner that avoids collisions and permits the railway system to deliver goods to various destinations.

As disclosed in the referenced patents and applications, a precision control system includes the use of an optimizing scheduler that will schedule all aspects of the rail system, taking into account the laws of physics, the policies of the railroad, the work rules of the personnel, the actual contractual terms of the contracts to the various customers and any boundary conditions or constraints which govern the possible solution or schedule such as passenger traffic, hours of operation of some of the facilities, track maintenance, work rules, etc. The combination of boundary conditions together with a figure of merit for each activity will result in a schedule which maximizes some figure of merit such as overall system cost.

As disclosed in the referenced patents and applications, and upon determining a schedule, a movement plan may be created using the very fine grain structure necessary to actually control the movement of the train. Such fine grain structure may include assignment of personnel by name, as well as the assignment of specific locomotives by number, and may include the determination of the precise time or distance over time for the movement of the trains across the rail network and all the details of train handling, power levels, curves, grades, track topography, wind and weather conditions. This movement plan may be used to guide the manual dispatching of trains and controlling of track forces, or may be provided to the locomotives so that it can be implemented by the engineer or automatically by switchable actuation on the locomotive.

The planning system is hierarchical in nature in which the problem is abstracted to a relatively high level for the initial optimization process, and then the resulting course solution is mapped to a less abstract lower level for further optimization. Statistical processing is used at all levels to minimize the total computational load, making the overall process computationally feasible to implement. An expert system is used as a manager over these processes, and the expert system is also the tool by which various boundary conditions and constraints for the solution set are established. The use of an expert system in this capacity permits the user to supply the rules to be placed in the solution process.

Currently, railroad operations are scheduled to meet various optimization criteria. Optimization of network resources is, in general an NP-complete problem. In most problems of meaningful size and dimension, such as scheduling the movement of trains over a rail network, this means that an exhaustive solution to ensure achievement of optimality is beyond present and near-term realizable computational capabilities.

The current disclosure provides a near optimal scheduling of resources by finding a transform of the problem to a domain that allows the original scheduling problem to be viewed in such a way that the most important variables are first identified, and a solution is found based on these identified variables. The solution thus produced is transformed back into the original problem domain. This method allows the near optimal solution to be generated using realizable computational capabilities.

These and many other objects and advantages of the present invention will be readily apparent to one skilled in the art to which the invention pertains from a perusal of the claims, the appended drawings, and the following detailed description of the embodiments.

DETAILED DESCRIPTION

Figure 1:
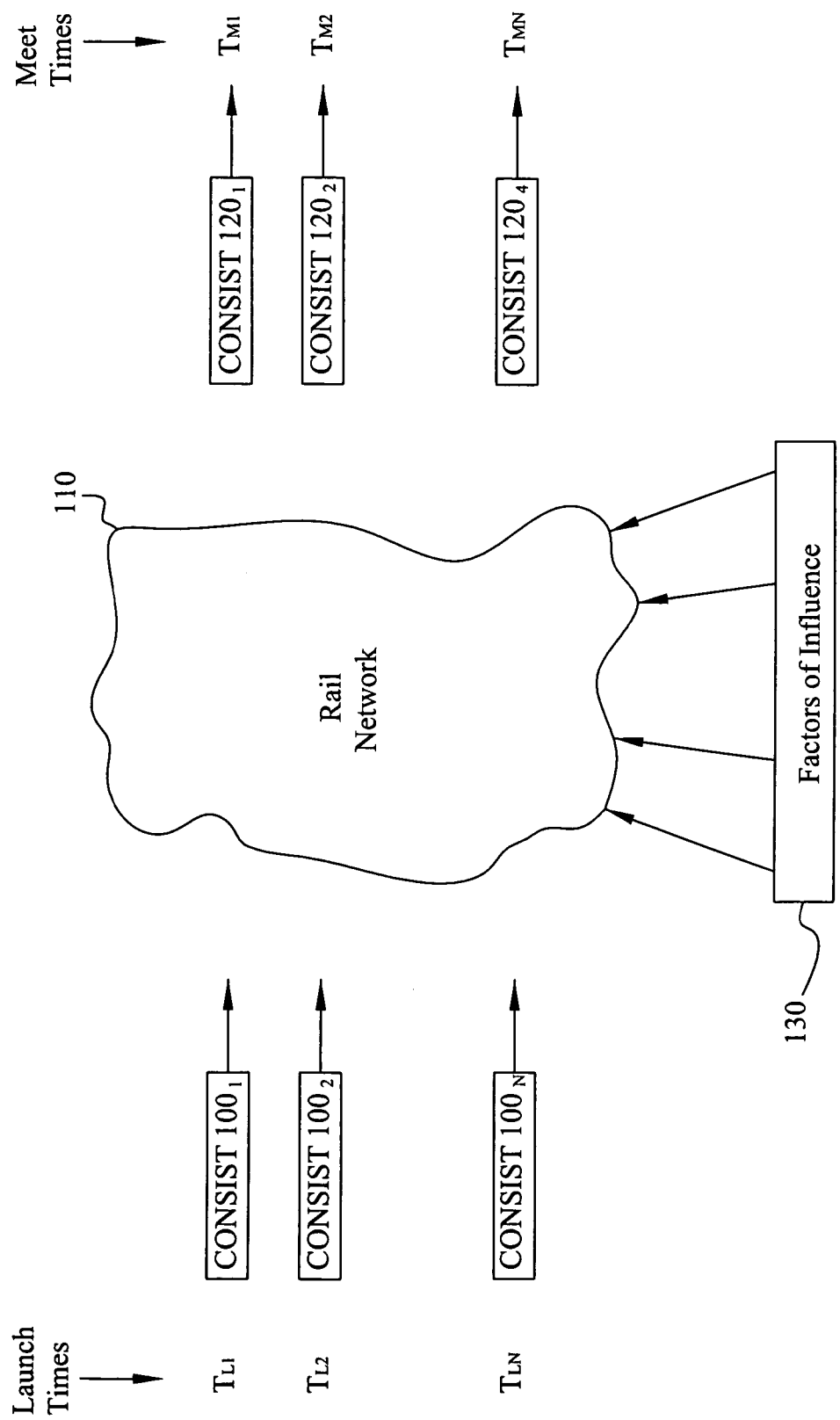
FIG. 1 is a simplified pictorial representation of one embodiment of the present disclosure.

A "consist" is a one or more power units combined with a set of cars.

FIG. 1 illustrates consists $100_1$ through $100_N$ positioned to enter the rail network 110. Factors of influence 130 represent the constraints associated with the planned movement of the consists 1 through N over the rail network. The factors of influence may include weather conditions, crew information, rail traffic information and rail track information. Each consist has an associated launch time $T_{L1}$ through $T_{LN}$. Virtual consists $120_1$ through $120^N$ represent the actual consist having been routed through the network 110 in a near optimal manner taking into account the factors of influence 130. Each virtual consist $120_1$ through $120_N$ has an associated arrival or meet time $T_{M1}$ through $T_{MN}$.

In one embodiment, solving for the near optimal solution of the network resources problem may be accomplished by first transforming the problem to another domain by use of a suitable transform. For example, a database may be created through modeling or collecting statistics from observing and measuring the performance of many time based scenarios as illustrated in FIG. 1. The information from the database may be used to perform a sensitivity analysis of a posited suboptimal solution. The results of this analysis may be used to Pareto the variables or dimensions of the transform space to identify the most important variables, or the variables having the greatest impact on the solution. A solution within that space can then be determined and then transformed back into the original time-based space.

For example, with respect to planning the movement of trains, the solution may be considered in the time space domain. However, because of the complexity of the problem it may be desirable to transform the problem into another domain, such as the cost domain. An analysis of the historical costs associated with the movement of trains through the network can be used to identify the relative costs associated with the planning of the network resources in the cost domain. A near-optimal solution that satisfies the most important variables in the cost domain may then be determined. The solution may then be transformed back to the time-space domain to provide a near-optimal solution. The cost domain is but one example of a suitable domain. Any other domain have a variable which can be evaluated can be used.

In one embodiment, the rail network 110 may be cast as a large binary matrix whose entries represent decisions at spatial points at specific times, e.g., switches, for sequencing a multi-quantity flow through the rail network. Solving for switch positions (binary) and decision times in order to affect a near optimal solution is achievable in many ways. For example, the states may first be considered to be continuous variables and not binary. Using continuous variables may allow for a more optimal solution. However, even though the solution will be facilitated through the use of continuous variables, the solution will in general not be admissible until the continuous variables of the solution are quantized to binary values. Methods for solution of the continuous variable case and its reduction to binary values may be gained through linear algebra techniques followed by a neural network, or hill climbing routines such as simulated annealing, or by representing the sequency decisions in a Fourier or a wavelet framework.

In one embodiment, it may be desirable to transform the problem to several different domains and pick the domain that presents the easiest problem to resolve. For example, in a second domain it may be determined that five variables are relatively important to the solution, while in a third domain, only two variables are relatively important to the solution. Solving the problem in the third domain would be desirable over the second domain because it should be easier to solve a problem having fewer variables of importance.

In another embodiment, a near optimal solution may be approached by the simultaneous propagation of the actual consists and the virtual consists into the network. For example, actual consists are move forward into the network at respective launch times and virtual consists are moved backwards into the network beginning at respective arrival times. In this embodiment, a divide and conquer approach is used to guide the near optimal solution by the objective of having the actual consists meet their respective virtual consists. Although the consists are being shifted in the time-space domain, at any point in which a scheduling problem is encountered, the problem can be transformed to another domain, an optimal solution determined, and then transformed back to the time space domain for a near optimal solution.

The steps of identifying the most important variable and practicing the embodiments of the near optimal solution for planning the movement of the trains can be implemented using computer usable medium having a computer readable code executed by special purpose or general purpose computers.

Identifying the most important variable by measuring and evaluating the historical performance can include resources on the line-of road tracks, in the rail yard, or resources located on industry lead tracks extending from a rail yard to an industry customer premise. Thus the traditional notion of only scheduling mainline resources can be extended by the current embodiment to include scheduling go resources to the end customer pick-up/drop-off point via the railroad.

While embodiments of the present invention have been described, it is understood that the embodiments described are illustrative only and the scope of the invention is to be defined solely by the appended claims when accorded a full range of equivalence, many variations and modifications naturally occurring to those of skill in the art from a perusal hereof.

What is claimed:

1. A method of scheduling the use of a plurality of resources in a rail network in a first-time space domain having predetermined constraints, comprising:
   (a) transforming the network resources scheduling problem to a second domain by relaxing some of the predetermined constraints;
   (b) measuring the historical performance of the scheduled network resources;
   (c) performing a sensitivity analysis of the measured historical performance to identify the relative importance of a variable affecting the performance; and
   (d) solving the scheduling problem as a function of the identified relative importance; and
   (e) transforming the solved transformed network resources scheduling problem back to the first time-space domain.

2. The method of scheduling of claim 1, wherein the second domain is one of a cost domain and a time domain.

3. A method of scheduling the use of a plurality of resources in a rail network in a first domain having a set of predetermined constraints, comprising:
   (a) transforming the network resources scheduling problem to a plurality of domains by relaxing the set of predetermined constraints;
   (b) for each of the plurality of domains:
      (i) measuring the historical performance of the scheduled network resources;
      (ii) performing a sensitivity analysis of the measured historical performance to determine the relative importance of a variable affecting the performance;
      (iii) identifying the most important variables using a predetermined criteria;
   (c) selecting the domain having the fewest number of identified important variables;
   (d) solving the transformed network resources problem in the selected domain; and
   (e) transforming the solved transformed network resources scheduling problem back to the first domain.

4. The method of claim 3 wherein the step of measuring the historical performance of network resources includes resources located within a rail yard.

5. The method of claim 3 wherein the step of measuring the historical performance of network resources include resources located on industry lead tracks extending form a rail yard to an industry customer premise.

6. A system for scheduling the use of a plurality of resources in a rail network in a first time-space domain having a predetermined set of constraints, comprising:
   a database containing measurements of a historical performance of scheduled network resources;
   a processor programmed to:
   (i) transform the network resources scheduling problem to a second domain by relaxing the predetermined set of constraints;
   (ii) access the database to perform a sensitivity analysis of the measured historical performance to identify the relative importance of a variable affecting the performance;
   (iii) solve the scheduling problem as a function of the identified relative importance;
   (iv) transform the solved transformed network resources scheduling problem back to the first time-space domain.

7. The system of claim 6, wherein the second domain is one of a cost domain and a time domain.

* * * * *